(12) United States Patent
Persson et al.

(10) Patent No.: US 6,401,699 B1
(45) Date of Patent: Jun. 11, 2002

(54) COMBUSTION ENGINE ARRANGEMENT

(75) Inventors: Per Persson, Partille; Lars Sundin, Malmö, both of (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/601,597

(22) PCT Filed: Feb. 2, 1999

(86) PCT No.: PCT/SE99/00130
§ 371 (c)(1),
(2), (4) Date: Oct. 18, 2000

(87) PCT Pub. No.: WO99/40312
PCT Pub. Date: Aug. 12, 1999

(30) Foreign Application Priority Data

Feb. 2, 1998 (SE) ............................................. 9800310

(51) Int. Cl.$^7$ .............................................. F02M 25/07
(52) U.S. Cl. ............................... 123/568.12; 123/568.17
(58) Field of Search ...................... 123/568.11, 568.12, 123/568.17, 184.35, 184.43, 184.49; 60/605.2

(56) References Cited

U.S. PATENT DOCUMENTS 4,249,382 A   2/1981  Evans et al. ................... 60/605
4,782,797 A * 11/1988 Kurahashi .............. 123/184.43
5,611,203 A   3/1997  Henderson et al. .......... 60/605.2
5,711,154 A   1/1998  Baechle et al. ............. 60/605.2

* cited by examiner

Primary Examiner—Gene Mancene
Assistant Examiner—Arnold Castro
(74) Attorney, Agent, or Firm—Lerner, David, Littenberg, Krumholz & Mentlik, LLP

(57) ABSTRACT

An internal combustion engine is disclosed including at least two cylinders, each including an inlet port, an air inlet manifold for providing air to the cylinders, at least two outlets for emitting exhaust gases from the cylinders, a recirculation conduit for reducing harmful emissions from the exhaust gases and extending from one of the outlet for recirculating the exhaust gases from an outlet to a connection point in the air inlet manifold thereby defining a first volume from the outlet to the connection point, the air inlet manifold being divided into at least two further volumes defined by the distance between the connection point to each of the inlet points, at least one turbine for recovering energy from the exhaust gases, and a compressor for compressing air supplied to the air inlet manifold, the first volume and the further volumes being dimensioned such that the recirculated exhaust gases are substantially equally distributed between each of the cylinders.

10 Claims, 1 Drawing Sheet

COMBUSTION ENGINE ARRANGEMENT

FIELD OF THE INVENTION

The present invention relates to a system for a combustion engine. The present invention more particularly relates to the reduction of harmful emissions from a diesel engine which is fitted with a system for recirculating the exhaust gases to the inlet of the engine, known as an EGR (exhaust gas recirculation) system.

BACKGROUND OF THE INVENTION

For vehicles powered by diesel engines there is a general desire to reduce, to the greatest possible extent, the emission of harmful pollutants in the exhaust gases from the engine. These emissions consist mainly of nitrous oxide pollutants ($NO_x$), carbon monoxide (CO), hydrocarbons (HC) and soot. A number of different measures can be taken in order to reduce these emissions. For example, it is known that the design of the combustion chamber in the cylinders of the engine and the timing of injecting fuel into the engine can be adapted to minimize the emissions. In those cases where the diesel engine is fitted with a turbo unit, the emission of $NO_x$ pollutants can also be reduced by cooling the air fed into the engine (known as intercooling.)

For engines running on gasoline, cleaning of the exhaust gases is normally carried out using an exhaust catalyser as part of the exhaust system. Because a diesel engine is run with an excess of air, the normal type of three-way catalyser cannot be used to reduce the $NO_x$ pollutants from diesel engines.

As a result of environmental requirements and expected future legislation, it has become increasingly desirable to reduce the emission of $NO_x$ pollutants in particular from diesel engines. A known way of achieving this is to delay the combustion in the cylinders. However, if combustion takes place too late, it reduces the efficiency of the engine in question. Another way of reducing the emissions of $NO_x$ pollutants from a diesel engine is to provide it with a known EGR (exhaust gas recirculation) system, by which a certain amount of the exhaust gases can be recirculated from the exhaust pipe of the engine to the inlet of the engine. The formation of $NO_x$ pollutants in a diesel engine is mainly exponentially proportional to the local maximum temperature in the combustion chamber, and by using an EGR system the temperature during combustion can be reduced by dilution with the exhaust gases, which in turn leads to a reduced formation of $NO_x$.

A diesel engine can be designed with an EGR system by means of a special pipe which is connected between the exhaust pipe of the engine and a point in connection with the engine's fresh air intake. Along this pipe there is fitted a controllable valve, which in turn is connected to a control unit. This control unit is arranged so that, depending upon the current operation of the engine, in particular as regards its rotational speed and load, it determines a suitable degree of opening for the valve. The setting of the valve in turn controls the amount of EGR gases that are recirculated to the inlet of the engine. If the pressure of the EGR gases at the exhaust side of the engine is higher than the pressure at the intake side this creates a driving force which urges the EGR gases to the inlet side of the engine.

Where a diesel engine with an EGR system is used together with a turbo system and an intercooler, it is not appropriate to recirculate the EGR gases to a point on the inlet side of the engine which is upstream of the turbo system's compressor and intercooler, as this can lead to unwanted fouling of the intercooler, and to high a temperature in the compressor. For this reason such an EGR system is preferably arranged so that the EGR gases are fed from a point on the exhaust side which is upstream of the turbo unit's turbine and to a point on the inlet side which is downstream of the intercooler.

Where an EGR system is used in the manner described above, a problem arises however, in that in most parts of the system there is a higher pressure from the turbo unit's compressor (that is at the point in the engine's intake pipe where the incoming fresh air is fed to the engine) than at the exhaust outlet of the engine. This means in turn that there is no driving force from the exhaust side of the engine to the intake side. For this reason no flow of EGR gases can be recirculated to the engine. It is already known that this problem can be solved by designing the turbo unit with variable turbine geometry. In this manner a sufficiently high pressure can be built up on the exhaust side of the engine. This solution has, however, the disadvantage that it results in deterioration of the engine's heat balance, which in turn makes the engine less efficient.

There is therefore a need for an engine system comprising an EGR system and an exhaust gas system with a turbo unit which provides a sufficient driving force for the EGR gases and which gives a minimal deterioration of the heat balance. This can be provided by the EGR system arranged in such a way that the EGR gases are taken from only one cylinder in the engine. By means of such a system the back-pressure can be increased for only one cylinder (whereby there is only a relatively small deterioration of the heat balance) so that a sufficient driving force is obtained. This can, in turn, be achieved by using a shunt valve which also works as a metering valve controlling the amount of EGR gases required at that particular point of the system. This also means that the exhaust gases from this one cylinder which are not directed to the EGR flow are directed to the turbine in the conventional way together with the exhaust gases from the other cylinders.

A problem that can arise in connection with a system which uses EGR gases from only one cylinder results from the fact that the exhaust gases are emitted from this one cylinder in pulses, which gives a correspondingly pulsating flow of EGR gases to the inlet side. This, in turn, means that the EGR gases are not distributed evenly to the cylinders at the inlet side of the engine, but that there are different levels of EGR gases to the different cylinders. If there is too great a range in the amount of EGR gases fed to the different cylinders, there will be an insufficient reduction of the formation of $NO_x$ caused by combustion in the cylinders with low EGR gas content. In addition, there is a danger of a considerable (and unwanted) build-up of smoke and soot in the exhaust gases from the cylinders with high EGR content.

An object of the present invention is to provide an improved system for reducing harmful emissions from a combustion engine, in particular a diesel engine with an EGR system and an exhaust system with a turbo unit, which in particular provides a sufficient driving force for the EGR gases and an even distribution of the EGR gases between the different engine cylinders.

SUMMARY OF THE INVENTION

In accordance with the present invention, this and other objects have now been realized by the invention of an internal combustion engine comprising at least two cylinders, each of the at least two cylinders including an inlet port, an air inlet manifold for providing air to the at least two cylinders, the air inlet manifold including a connection point, at least two outlets for emitting exhaust gases from the at least two cylinders, a recirculation conduit for reducing harmful emissions in the exhaust gases, the recirculation conduit extending from one of the at least two outlets for recirculating the exhaust gases from the one of the at least two outlets to the connection point thereby defining a first volume from the one of the at least two outlets to the connection point, the air inlet manifold being divided into at least two further volumes defined by the distance between the connection point to each of the at least two inlet ports, at least one energy recovery member for recovering energy from the emitted exhaust gases, and a compressor for compressing air for supply to the air inlet manifold, the first volume and the at least two further volumes being dimensioned such that the recirculated exhaust gases are substantially equally distributed between each of the at least two cylinders. In a preferred embodiment, the air inlet manifold includes a partition for dividing the air inlet manifold into at least two air inlet manifold sections for defining the at least two further volumes. In accordance with a preferred embodiment, the at least two cylinders comprise at least two pluralities of cylinders, and the at least two air inlet manifold sections are disposed so as to supply the air and the recirculated exhaust gases separately to the at least two pluralities of cylinders.

In accordance with one embodiment of the internal combustion engine of the present invention, the partition extends from a point upstream of the connection point. Preferably, the partition includes an opening for reducing pulses in the gas mixture fed into the air inlet manifold.

In accordance with another embodiment of the internal combustion engine of the present invention, the recirculation conduit recirculates the exhaust gases from only one of the at least two cylinders, whereby the pressure in the recirculation conduit exceeds the pressure in the air inlet manifold.

In accordance with another embodiment of the internal combustion engine of the present invention, the engine includes a cooler disposed in the recirculation conduit for cooling the exhaust gases recirculated to the air inlet manifold.

In accordance with another embodiment of the internal combustion engine of the present invention, the at least one energy recovery member comprises a turbine.

In accordance with another embodiment of the internal combustion engine of the present invention, the engine includes a controllable valve disposed in the recirculation conduit for controlling the amount of the exhaust gases recirculated therein. Preferably, the controllable valve comprises an electronically controllable shunt valve which is continuously adjustable between open and closed positions.

In accordance with another embodiment of the internal combustion engine of the present invention, the controllable valve comprises an on/off valve.

The system according to the present invention is intended for a combustion engine which comprises at least two cylinders, an inlet for the supply of air, an outlet for the output of exhaust gases, an additional pipe for recirculating exhaust gases from at least one cylinder in the engine to the inlet for the reduction of harmful emissions from the engine, and at least one energy-recovery unit comprising a device for recovering energy from the exhaust gases, and a device for compressing air for the inlet. The present invention is characterized by the inlet being designed with a volume calculated from the connection of the pipe to the inlet and up to the inlet port of the respective cylinder which is so dimensioned that the exhaust gases which are recirculated from the cylinder are distributed substantially equally between the different cylinders of the engine. By means of this even distribution the conditions are favorable for optimal reduction of NO emissions from the engine.

The present invention can, for example, be used with a six-cylinder diesel engine and according to a preferred embodiment of the present invention the inlet can then consist of an inlet manifold which is divided into two halves or partial volumes for three cylinders each. In addition, there is preferably recirculation of EGR gases from only one engine cylinder, which means that the back-pressure is only increased for that cylinder. This results in a minimal deterioration of the gas exchange work of the engine.

BRIEF DESCRIPTION OF THE DRAWINGS

The present invention will now be described in greater detail in the following detailed description, which, in turn, refers to the attached figure, in which.

DETAILED DESCRIPTION

Figure 1:
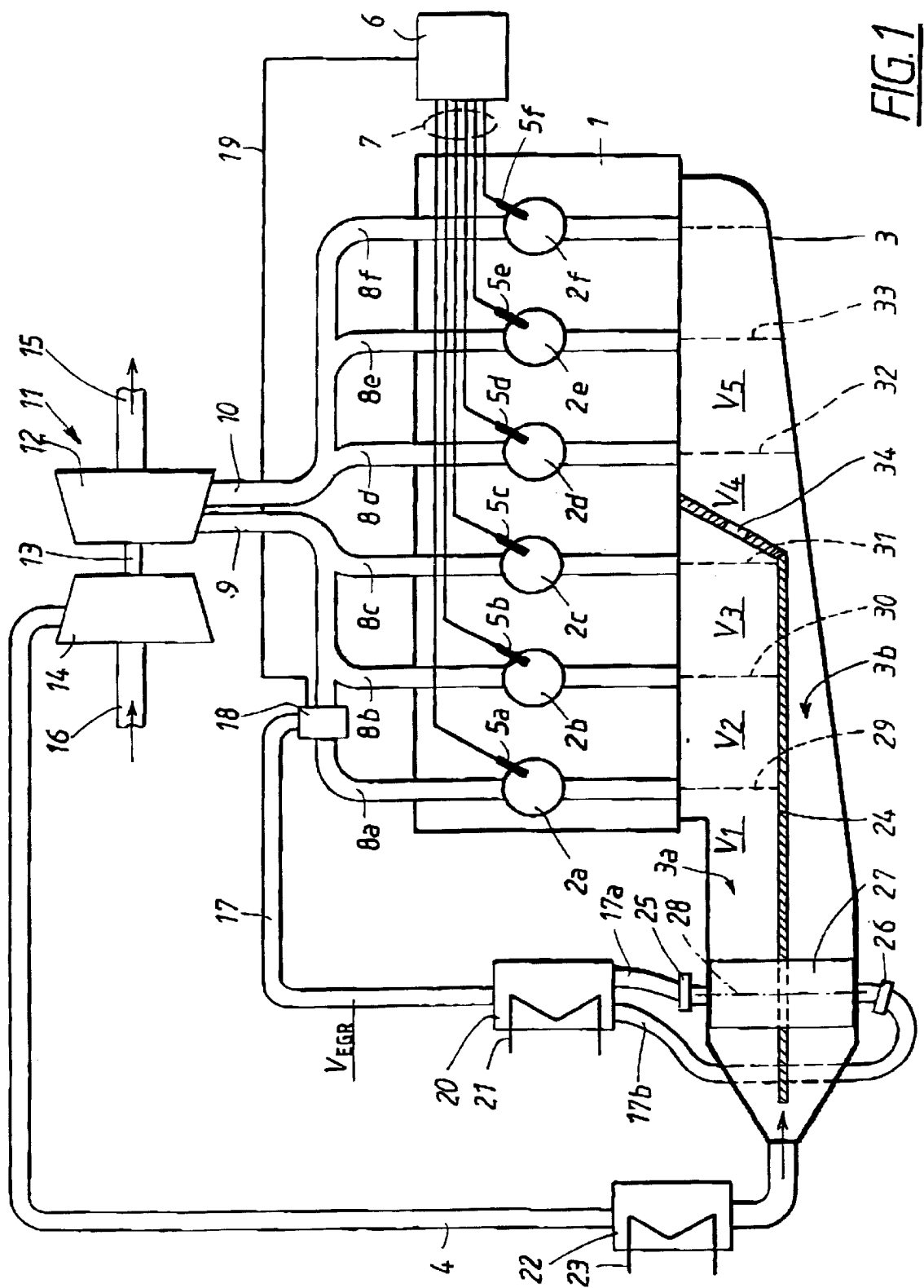
FIG. 1 is a top, elevational, diagrammatic representation of the system of the present invention.

Referring to the drawing, FIG. 1 shows diagrammatically a system according to the present invention which in particular can be used for a combustion engine 1 of the diesel type. According to a preferred embodiment the diesel engine 1 is intended to be used in a vehicle and comprises six cylinders, 2a, 2b, 2c, 2d, 2e and 2f. However, the present invention is not restricted to a certain number of cylinders, a certain cylinder configuration or a certain type of fuel.

In a known manner, the engine 1 is designed with an inlet manifold 3 to which air is fed from the atmosphere through an inlet pipe 4. As will be described in detail below, the air supplied is distributed between the different cylinders, 2a–2f. In addition, fuel is supplied to the cylinders, 2a–2f, through a corresponding number of fuel injection devices, 5a, 5b, 5c, 5d, 5e and 5f, which are arranged in association with the respective cylinders, 2a–2f, and which are each connected to a central control unit 6 by means of electrical connections 7. The control unit 6, which is preferably computer-based, is arranged, in a known manner, to control the injection devices, 5a–5f, so that at any moment a suitable fuel/air mixture is provided for the engine 1, that is to say so that the mixture provided at any time is adjusted to suit the current operating conditions. The injection device can also be of conventional mechanical type.

The cylinders, 2a–2f, are provided with an exhaust gas outlet, 8a, 8b, 8c, 8d, 8e and 8f, which together form a branched exhaust gas pipe. The three exhaust gas outlets, 8a–8c, which lead out from the three first cylinders 2a–2c are connected to a first exhaust gas pipe 9, while the three exhaust gas outlets, 8d–8f, which lead out from the fourth, fifth and sixth cylinders, 2d–2f, are connected to a second exhaust gas pipe 10. The first exhaust gas pipe 9 and the second exhaust gas pipe 10 pass through a turbo unit, 11 which is principally conventional. Thus, the turbo unit 11 comprises a device for recovering energy from the exhaust gases in the form of a turbine 12 which is rotated by the exhaust gases which flow through the two exhaust gas pipes, 9 and 10. The exhaust gases which have passed through the turbine 12 are then led out into the atmosphere through an outlet 15 which, in turn, is preferably fitted with a (not shown) silencer.

Instead of a conventional turbo unit, a known Comprex charger can, in principle, be used as an alternative device for recovering energy from the exhaust gases and supplying compressed air to the inlet of the engine.

As an alternative to the embodiment shown in the figure, which is designed so that the exhaust gas outlets, 9 and 10, are arranged in two groups with two pipes leading to the turbine 12 (known as a twin inlet), the exhaust gas outlets, 9 and 10, can instead join into a single exhaust gas pipe (known as a single inlet).

According to another alternative to the embodiment shown in the figure, the exhaust gas outlet can be divided into two or more groups by which the exhaust gases are fed to a corresponding number of separate turbo units.

The turbine 12 is arranged on an axle 13 on which a compressor is also arranged. The energy which is recovered from the flow of exhaust gas by the turbine 12 is transferred in this way to the compressor 14 which is arranged to compress air flowing in through an inlet 16 and to feed this air to the inlet pipe 4. By this means, in a known manner an increased amount of fuel can be delivered to the engine 1, whereby its power can be increased.

The engine 1 is equipped with a system for recirculating a certain amount of exhaust gases to the inlet side of the engine 1. By way of introduction, such an EGR (exhaust gas recirculation) system is already known. According to the present invention an additional exhaust gas pipe in the form of an EGR pipe 17 is therefore connected to, for example, the first exhaust gas outlet 8a, that is the outlet which takes exhaust gases from the first cylinder 2a. The EGR pipe 17 is connected to the first exhaust gas outlet 8a by means of a special EGR valve 18, which preferably consists of an electrically regulated shunt valve. As is shown in the figure, the EGR valve 18 is positioned upstream of the turbine 12 and also upstream of the point where the first exhaust gas outlet 8a is connected to the second exhaust gas outlet 8b. In addition, the EGR valve 18 is connected to the control unit 6 by means of an additional electrical connection 19.

The control unit 6 is arranged to set the valve 18 in a closed, open or partially open position, depending upon the current operating conditions. Dependent upon the state of the valve 18, a corresponding flow of exhaust gases will thus be recirculated to the inlet manifold 3 through the EGR pipe 17. At the same time a corresponding reduction is obtained in the flow of exhaust gases from the first cylinder 2a to the first exhaust gas pipe 9. By means of the recirculating of EGR gases to the inlet manifold 3, a reduction in temperature is achieved during combustion in cylinder 2, whereby the $NO_x$ formation in cylinder 2 is reduced.

To control the valve 18, the control unit 6 is arranged to determine the rotational speed and load (torque) of the engine 1 and to calculate from these parameters the amount of EGR gases required to be recirculated to the inlet manifold. This amount of EGR gases is mainly determined in the control unit 6 by utilizing a stored table which gives the required amount of EGR gases for optimal reduction of $NO_x$ pollutants as a function of the rotational speed and load. Dependent upon the calculated value for the amount of EGR gas, the valve 18 is then set in a corresponding position by means of a signal from the control unit 6.

The $NO_x$ formation in cylinder 2 is dependent upon the temperature and for this reason it is desirable to reduce to the greatest possible extent the temperature of the gas fed into the engine 1 (which is made up of air and recirculated EGR gases). For this reason, the EGR pipe 17 is equipped with a cooler 20 which is designed for cooling the EGR gases recirculated to the inlet manifold 3. For this purpose, the cooler 20 comprises a loop 21 through which a suitable cooling medium is passed. This cooling medium preferably consists of the ordinary coolant used in the engine 1, but as an alternative air can be used for this cooling. The EGR gases can be cooled by means of the cooler 21, which further contributes to a reduction in the amount of $NO_x$ pollutants which are created.

Along the inlet pipe 4 there is an intercooler 22 which is used to cool the compressed air which is fed to the engine by means of the compressor 14. This also contributes to a reduction in the amount of $NO_x$ pollutants which are created in the engine 1. This second cooler 22 is preferably designed for cooling by air, which is indicated diagrammatically by the reference 23.

According to the present invention, the inlet manifold 3 is designed in a manner which is intended to provide an even distribution of the recirculated EGR gases to the cylinders 2a–2f. For this purpose, the inlet manifold 3 is preferably divided into a first inlet section 3a and a second inlet section 3b which are separated by means of a partition 24. This is shown in the figure, in which the actual inlet manifold 3 is shown in cross section. In addition the EGR pipe 17 is arranged so that it divides downstream of the EGR cooler 20 and goes to a first pipe section 17a and a second pipe section 17b. The first pipe section 17a opens into the first inlet section 3a by means of a first calibrated opening 25, while the second pipe section 17b opens into the second inlet section 3b by means of a second calibrated opening 26. The first opening 25 is designed with a first predetermined area $A_1$, while the second opening 26 is designed with a second predetermined area $A_2$.

The first pipe section 17a and the second pipe section 17b open into an EGR mixer 27 which consists of a primarily pipe-shaped element, which comprises a connection between the inlet manifold 3 and the inlet pipe 4. In this EGR mixer 27 there is a primarily homogenous mixing of the charging air fed through the inlet pipe 4 and the EGR gases recirculated from the first cylinder 2a and fed through the first pipe section 17a or the second pipe section 17b. For this purpose the EGR mixer 27 is divided in two so that the EGR gases in the first pipe section 17a are mixed with charging air in the inlet pipe 4 separately from the mixing of the EGR gases from the second pipe section 17b with charging air. The mixture of charging air and EGR gases is then fed to the first three cylinders, 2a–2c, through the first inlet section 3a and to the other three cylinders, 2d–2f, through the second inlet section 3b.

The term "homogenous mixing" is used to describe the fact that homogenous mixing takes place in the EGR mixer 27 principally across the direction of flow of the air. However, there are variations in this mixing during a particular operation cycle along the direction of flow of the air. These variations are due to the exhaust gases being supplied in pulses from the first cylinder 2a while the charging air mainly flows evenly during the said operation cycle.

As shown in the figure, the partition 24 passes through both the inlet manifold 3 and the EGR mixer 27, that is upstream of the point where the EGR gases are fed into the EGR mixer 27. Consequently, due to the partition 24 there is a division of the flow of gas between the two inlet sections, 3a and 3b, before it reaches the EGR mixer 27.

According to the present invention, pressure is built up in the first exhaust gas outlet 8a during operation of the engine 1, which pressure is higher than the pressure on the intake side of the engine 1. In this manner, a sufficient driving force is obtained for recirculating the EGR gases to the inlet manifold 3, without appreciable reduction in heat balance and without any appreciable deterioration in the efficiency of the engine 1.

A basic principle underlying the present invention is that the volume of the inlet manifold 3 and the volumes of the two inlet sections, 3a and 3b, are calculated in order to provide a principally equally large flow of EGR gases to each of the cylinders, 2a–2f. The inlet sections, 3a and 3b, consist in turn of determined partial volumes which extends between the branching-off positions defined by the openings, 25 and 26, for EGR gases and the inlet port (not shown) for each of the cylinders, 2a–2f. In particular, the volumes of the inlet sections, 3a and 3b, are determined so that the volumes which are created between the EGR valve 18 and each of the cylinders, 2a–2f, enable the periodically recurring amounts of EGR gas from the first cylinder to pass along the inlet sections, 3a and 3b, and be distributed evenly between the cylinders, 2a–2f, when their respective inlet valves (not shown) are open.

In the figure the reference $V_{EGR}$ refers to the volume which is created between the exhaust gas valve (not shown) of the first cylinder 2a and the openings, 25 and 26, that is comprising the volume which extends through the valve 18, the pipe 17, the EGR cooler 20 and the pipe sections, 17a and 17b. In addition, the reference $V_1$ refers to the volume between the EGR mixer 27 and the inlet port of the first cylinder 2a, in particular the volume between a first imaginary plane 28 which extends across the longitudinal direction of the EGR mixer 27, at the opening of the first pipe section 17a, and up to a further imaginary plane 29 which extends across the inlet manifold 3, at the first cylinder 2a. In a corresponding manner, the volume $V_2$ is defined as the volume between the plane 29 at the first cylinder 2a and the inlet port of the second cylinder 2b, whereby the latter is defined by a further transverse plane 30. In addition, the volume $V_3$ is defined as the volume between the plane 30 at the second cylinder 2b and the inlet port of the third cylinder 2c, which is defined by a further plane 31.

The volume $V_4$ is defined as the volume between the EGR mixer 27, that is the plane 28, up to the inlet port of the fourth cylinder 2d, which is defined by a further transverse plane 32. In addition, the volume $V_5$ is defined as the volume between the plane 32 and the inlet port of the fifth cylinder 2e, which is defined by a further transverse plane 33.

According to the embodiment shown in the figure the first pipe section 17a and the second pipe section 17b are arranged along the same plane, that is along the plane 28. In an alternative embodiment, these two pipe sections, 17a and 17b, can, however, also open out at different points along the EGR mixer 27.

According to this embodiment, the partition 24 is designed with an opening 34, that is a connection between the first inlet section 3a and the second inlet section 3b. The opening 34 is positioned downstream of the third cylinder 2c and is designed with an opening area $A_3$. This opening 34 can reduce pulses in the flow of gas fed through the inlet manifold 3, which would otherwise impair the gas exchange work in the engine 1.

According to the present invention, the dimensions of the respective volumes, $V_{EGR}$ and $V_1$–$V_5$, are selected so that the flow of EGR gases through the pipe 17 is distributed principally equally between the six cylinders, 2a–2f. The size of the opening areas $A_1$–$A_3$ is preferably also selected in a way that contributes to this equal distribution. The EGR gases that are fed through the EGR pipe 17 periodically in the form of pulses of exhaust gas from the first cylinder 2a, are taken past the inlet ports of the six cylinders, 2a–2f. By means of the setting of the volumes, $V_1$–$V_3$, according to the present invention it is ensured that a certain amount of EGR gases is fed in to the first cylinder 2a when the inlet valve (not shown) of the first cylinder 2a is open, that an essentially equally large amount is fed in to the second cylinder 2b when the inlet valve (not shown) of the second cylinder 2b is open and that essentially equally large amount is fed into the third cylinder 2c when the inlet valve (not shown) of the third cylinder 2c is open. In a corresponding manner, by means of the setting of the volumes $V_4$–$V_5$ it is ensured that an essentially equally large amount of EGR gases is fed in to the fourth, fifth and sixth cylinder, 2d–2f, when the inlet valves (not shown) of these cylinders, 2d–2f, are open.

The design of the volumes, $V_{EGR}$ and $V_1$–$V_5$, and the areas, $A_1$–$A_3$, can be determined by practical trials or by means of simulations using theoretical models. The flow and the distribution of EGR gases to each of the cylinders, 2a–2f, is a complex process involving for example the pressure, temperature, speed and composition of the EGR gases in each of the volumes, $V_{EGR}$ and $V_1$–$V_5$. The settings can therefore be worked out by computer simulation. For such a design an appropriate operating state can be taken as the starting point, for example medium rotational speeds and loads, whereby an even EGR distribution between the cylinders is obtained in normally occurring operating states of the engine. For a standard six-cylinder engine of the diesel type with a compression ratio of the order of 12:1, the volumes, $V_{EGR}$ and $V_1$–$V_5$, and the areas, $A_1$–$A_3$, are preferably selected as follows:

| $V_{EGR}$ | $V_1$ | $V_2$ | $V_3$ | $V_4$ | $V_5$ | $A_1$ | $A_2$ | $A_3$ |
|---|---|---|---|---|---|---|---|---|
| 4.8 | 2.4 | 0.8 | 0.7 | 4.6 | 0.9 | 1.9 | 2.1 | 5.0 |

In the table above the volumes are given in dm3 and the areas in cm$^2$. The present invention provides for an even distribution of EGR gases to the cylinders, which in turn makes possible a considerable reduction in the NO$_x$ emissions from the engine.

The size of the volume extending from the plane 33 up to the inlet of the sixth cylinder 2e is of no great significance, as practically the whole amount of EGR gas which is fed as far as this volume will be drawn in to the sixth cylinder 2e.

The different volumes and areas are set according to a particular operating state which is determined in advance. In those cases where it is desirable to adapt the present invention to suit some alternative operating state, other values for the volumes and areas are obtained. According to the present invention, the volumes and areas can also be set, for example, according to the power of the engine 1 or according to what type of turbo unit 11 is used.

The present invention is not restricted to the embodiment described above, but can be varied within the framework of the following claims. For example, the number of cylinders in the engine can vary. In addition the valve 18 can alternatively be of the type that has an on/off setting, that is it can be set only in an open position or a closed position.

In addition, the control unit 6 can be arranged to control, for example, the timing of injection for the injection devices, 5a–5f, in order to further reduce the emission of NO$_x$ pollutants.

The inlet manifold can be divided into two inlet sections with three cylinders each (as shown in the figure) or can alternatively be divided into three inlet sections with two cylinders each, or some other combination which can be selected, for example, depending upon the number of cylinders in the engine for which the present invention is used. In addition, the inlet manifold can also in principle be designed as a single volume, particularly in engines which have fewer than six cylinders.

In principle, any one of the engine's cylinders can be used to supply the EGR gases to be recirculated to the inlet of the engine. In order to make the installation of the EGR pipe and the EGR valve simpler, however, the first or sixth cylinder should preferably be selected for this purpose (provided that a straight six-cylinder engine is used). In principle EGR gases can also be taken from more than one cylinder.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An internal combustion engine comprising
   at least two cylinders, each of said at least two cylinders including an inlet port;
   an air inlet manifold for providing air to said at least two cylinders, said air inlet manifold including a connection point;
   at least two outlets for emitting exhaust gases from said at least two cylinders;
   a recirculation conduit for reducing harmful emissions in said exhaust gases, said recirculation conduit extending from said one of said at least two outlets to said connection point thereby defining a first volume from said one of said at least two outlets to said connection point,
   said air inlet manifold being divided into at least two further volumes defined by the respective distances between said connection point to each of said at least two inlet ports;
   at least one energy recovery member for recovering energy from said emitted exhaust gases; and
   a compressor for compressing air for supply to said air inlet manifold,
   said first volume and said at least two further volumes being dimensioned such that said recirculated exhaust gases are substantially equally distributed between each of said at least two cylinders.

2. The internal combustion engine of claim 1 wherein said recirculation conduit recirculates said exhaust gases from only one of said at least two cylinders, whereby the pressure in said recirculation conduit exceeds the pressure in said air inlet manifold.

3. The internal combustion engine of claim 1 including a cooler disposed in said recirculation conduit for cooling said exhaust gases recirculated to said air inlet manifold.

4. The internal combustion engine of claim 1 wherein said at least one energy recovery member comprises a turbine.

5. The internal combustion engine of claim 1 including a controllable valve disposed in said recirculation conduit for controlling the amount of said exhaust gases recirculated therein.

6. The internal combustion engine of claim 5 wherein said controllable valve comprises an electronically controllable shunt valve which is continuously adjustable between open and closed positions.

7. The internal combustion engine of claim 5 wherein said controllable valve comprises an on/off valve.

8. An internal combustion engine comprising
   at least two pluralities of cylinders, each cylinder of said at least two pluralities of cylinders having an inlet port and an outlet for emitting exhaust gases;
   an air inlet manifold for providing air to said at least two pluralities of cylinders, said air inlet manifold including a connection point;
   a recirculation conduit for reducing harmful emissions in said exhaust gases, said recirculation conduit extending from at least one of said outlets to said connection point thereby defining a first volume from said at least one outlet to said connection point, said air inlet manifold having a partition dividing said air inlet manifold into at least two air inlet manifold sections defining respective sectional volumes
   each of said at least two air inlet manifold sections being disposed to supply said recirculated exhaust gases to each of said at least two pluralities of cylinders, said each of said sectional volumes being divided into a plurality of further volumes defined by the respective distances between said connection point to each of said inlet ports;
   at least one energy recovery member for recovering energy from said emitted exhaust gases; and
   a compressor for compressing air for supply to said air inlet manifold,
   said first volume and said pluralities of further volumes being dimensioned such that said recirculated exhaust gases are substantially equally distributed between said each cylinder of said at least two pluralities of cylinders.

9. The internal combustion engine of claim 8 wherein said partition includes an opening for reducing pulses in said recirculated exhaust gases fed into said air inlet manifold.

10. An internal combustion engine comprising at least two cylinders, each of said at least two cylinders including an inlet port;
   an air inlet manifold for providing air to said at least two cylinders, said air inlet manifold including a connection point;
   at least two outlets for emitting exhaust gases from said at least two cylinders;
   a recirculation conduit for reducing harmful emissions in said exhaust gases, said recirculation conduit extending from one of said at least two outlets for recirculating said exhaust gases from said one of said at least two outlets to said connection point thereby defining a first volume from said one of said at least two outlets to said connection point,
   said air inlet manifold having a partition extending from a point upstream of said connection point, said partition dividing said air inlet manifold into at least two air inlet manifold sections defining respective sectional volumes, at least one of said sectional volumes being divided into at least two further volumes defined by the respective distances between said connection point to each of said at least two inlet ports; at least one energy recovery member for recovering energy from said emitted exhaust gases; and
   a compressor for compressing air for supply to said air inlet manifold,
   said first volume and said at least two further volumes being dimensioned such that said recirculated exhaust gases are substantially equally distributed between each of said at least two cylinders.

* * * * *

UNITED STATES PATENT AND TRADEMARK OFFICE
CERTIFICATE OF CORRECTION

PATENT NO. : 6,401,699 B1
DATED : June 11, 2002
INVENTOR(S) : Per Persson and Lars Sundin It is certified that error appears in the above-identified patent and that said Letters Patent is hereby corrected as shown below:

<u>Title page,</u>
Item [30], Foreign Application Priority Data,
"Feb. 2, 1998" should read -- Feb. 4, 1998 --.

<u>Column 4,</u>
Line 6, "NO" should read -- $No_x$ --.

Signed and Sealed this

Eighth Day of October, 2002

*Attest:*

JAMES E. ROGAN
*Attesting Officer*     *Director of the United States Patent and Trademark Office*